United States Patent

Kim et al.

[11] Patent Number: 4,752,624
[45] Date of Patent: Jun. 21, 1988

[54] PROCESS FOR THE PREPARATION OF MULTI-COMPONENT POLYMER MEMBRANE

[75] Inventors: Seong C. Kim; Jae H. Lee; Jang S. Han, all of Seoul; Joo O. Song, Daegu, all of Rep. of Korea

[73] Assignee: Korea Advanced Institute of Science and Technology, Seoul, Rep. of Korea

[21] Appl. No.: 1,363

[22] Filed: Jan. 8, 1987

[30] Foreign Application Priority Data

Aug. 29, 1986 [KR] Rep. of Korea .................. 7221/1986

[51] Int. Cl.⁴ .............................................. C08J 9/00
[52] U.S. Cl. .................................. 521/137; 521/139; 525/130; 525/903
[58] Field of Search ................. 521/137; 525/903, 130

[56] References Cited

U.S. PATENT DOCUMENTS 4,302,553 11/1981 Frisch et al. .................... 525/903
4,423,099 12/1983 Mueller et al. .................. 525/903

Primary Examiner—Morton Foelak
Attorney, Agent, or Firm—Birch, Stewart, Kolasch & Birch

[57] ABSTRACT

Process for the preparation of interpenetrating polymer network membrane, composed of hydrophilic-hydrophobic two phase structure with varying degree of segregation of the hydrophilic and hydrophobic component by a polymerization reaction comprising controlling the relative rate of polymerization of the component polymers, or controlling the reaction temperature and the reaction pressure during the interpenetrating polymer network forming reaction and particularly by a process which comprises, subjecting a monomeric reaction mixture to a simultaneous polymerization and crosslinking reaction or a sequential polymerization and crosslinking reaction, to produce at least a polymer network of a urethane resin of general formula (I)

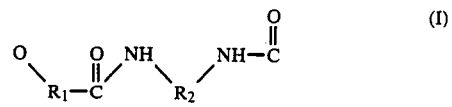

wherein
R₁ is

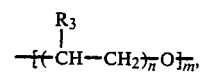

wherein
R₃ stands for hydrogen or methyl group, n is integer of 1-3 and m is integer of 5-40,
R₂ is either

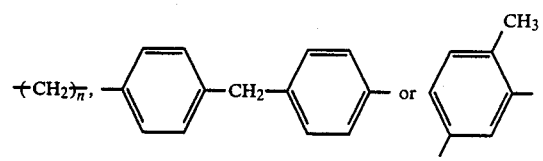

wherein n is integer of 2-8, and styrene resin of general formula (II)

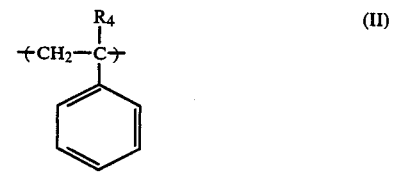

wherein R₄ is hydrogen or methyl group. The polymerization temperature being kept in the range of 60° and 150° C., and the polymerization pressure being kept in the range of 1 and 10,000 atm.

8 Claims, No Drawings

PROCESS FOR THE PREPARATION OF MULTI-COMPONENT POLYMER MEMBRANE

BACKGROUND OF THE INVENTION

The present invention relates to a novel and improved process for the preparation of a polymer membrane which is useful for the selective separation of a liquid mixture Particular, the present invention relates to a process for the preparation of an interpenetrating polymer network membrane composed of hydrophilic-hydrophobic two phase structure with a varying degree of segregation of the hydrophilic and hydrophobic component by a polymerization reaction comprising controlling the relative rate of polymerization of the component polymers, or controlling the reaction temperature and the reaction pressure during the interpenetrating polymer network forming reaction. More particularly, the present invention relates to a process for the preparation of an interpenetrating polymer network (IPN), the (IPN) being a crosslinked polymer alloy, which is utilized for the separation of a liquid mixture, by a simultaneous polymerization and crosslinking reaction or a sequential polymerization and crosslinking reaction, to form a urethane resin of general formula (I)

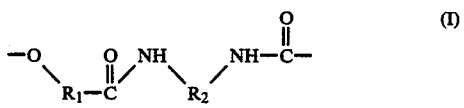

wherein R$_1$ is

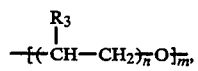

wherein
R$_3$ stands for hydrogen or methyl group, n is integer of 1-3 and m is integer of 5-40,
R$_2$ is either

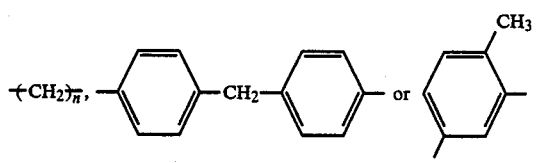

wherein n is integer of 2-8,
and a styrene resin of general formula (II)

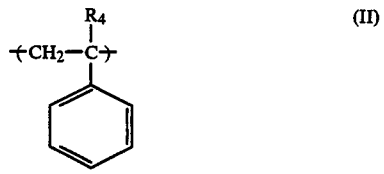

wherein R$_4$ is hydrogen or methyl group.

For the separation of liquid mixtures, heretofore, conventional distillation techniques were mostly ulilized. However, these techniques are not suitable for the separation of components with close boiling point ranges, azeotropic mixtures and heat-sensitive mixtures. Consequently, separation techniques utilizing polymer members which are both, energy conserving and simple in operation are, under development, (R. E. Kesting, Synthetic Polymeric Membranes, McGraw Hill, New York 1971). A separation memberane is defined as a membrane selectively permeable to a specific component in the mixture, and the general requirement of the membrane is high permeability and good mechanical properties.

When the affinity between the liquid mixture and membrane is high, the swelling of the membrane increases thus enhancing the permeability. However, the increased swelling usually reduces the permselectivity and the mechanical strength property of the membrane. Therefore, a polymer membrane with well balanced permeability, permselectivity and mechanical properties, is desired.

BRIEF SUMMARY OF THE INVENTION

The invention relates to a process for preparing polymer membranes composed of different types of polymers namely, those which comprise hydrophillic components to enhance permeability and those which comprise hydrophobic components to restrict excessive swelling.

It is known that block or graft copolymer membranes which are composed of hydrophilic-hydrophobic constituents and have microphase-separated nature, are suitable as separation membranes of mixtures of water-alcohol, water-acetic acid, etc.

The hydrophilic constituent in the membrane is swollen by the hydrophilic component, thus enhancing permselectivity and permeability and the hydrophobic constituent thereby restricts the membrane from excessive swelling to maintain good mechanical properties.

The mechanically mixed polymer membranes, which contain hydrophilic-hydrophobic polymers, is also known. However, these mixtures exhibit a large degree of phase separation due to the incompatibility of the component polymers and show poor mechanical properties due to poor adhesion at the phase boundaries, and thus cannot be used as separation membrane materials.

DETAILED DESCRIPTION OF THE INVENTION

The invention is characterized by the fact that the polymer membrane is prepared by the combination of hydrophilic-hydrophobic constituents utilizing an interpenetrating polymer network formation instead of a mechanical mixing.

In detail, as the cross-linked chains of different polymers are physically interlocked in a chain form restricting the phase separation between the hydrophilic and hydrophobic constituents, membrane materials with good mechanical properties and with micro-phase separated structures, can be prepared even from hydrophilic-hydrophobic or polar-nonpolar polymer mixtures.

The process for preparing an interpenetrating polymer network may be classified by known simultaneous polymerization and sequential polymerization processes.

These processes are described in detail in publications (L. H. Sperling, Interpenetrating polymer networks and Related Materials, Plenum Press, New York, 1981).

To briefly explain, simultaneous polymerization is carried out by mixing monomers or prepolymers of each constituent, crosslinking agent and catalyst or initiator, followed by simultaneous polymerization and crosslinking via two different non-interfering reaction mechanisms (e.g. addition and condensation reaction).

More particularly in simultaneous polymerization, low molecular weight hydrophilic constituent and hydrophobic constituent are dissolved into a solution and simultaneously polymerized and crosslinked to form polymers, and at the same time polymer networks of hydrophilic and hydrophobic constituents are interlocked.

Sequential polymerization is carried out by forming one polymer network first and then swelling the network in the mixture of monomer of other constituent, crosslinking agent and catalyst or initiator, followed by polymerization of the penetrated monomer mixture by heat or ultraviolet light in the presence of the other network and thus forming an interlocking of the first and second formed polymer network.

Furthermore, with varying reaction pressures and temperatures, the partial separation of the hydrophilic constituent and the hydrophobic constituent can be controlled to form particles of sizes of from about 100 Å to 1 micron. Thus the permselectivity of liquid mixture can also be controlled.

In the process for preparing a polymer membrane of interpenetrating polymer network according to the invention, there are few limitations in the selection of the constituent polymer materials. Since the phase separation is restricted by the formation of the interpenetrating polymer network, a good quality membrane with good mechanical properties and permeability can be obtained not only from polymer materials with good compatibility but also from polymer mixtures of poor compatibility.

In particular, a polymer membrane, which has been prepared by thoroughly mixing compatible hydrophilic-hydrophobic polymer constituents and by restricting the gross phase separation by forming the IPN network, can possess good water permeability.

Accordingly, the membrane can be utilized in the dehydration of water-organic solvent mixture, and particularly in the preparation of 100% pure alcohol from a azeotropic composition of water-ethanol (ethanol content: 95.6%).

The object of the invention is therefore, to prepare multicomponent polymer membrane which is useful for the liquid-liquid separation by restricting the phase separation of the less compatible polymer constituent by means of physical interlocking, through the interpenetrating polymer network formation.

The membrane preparation process, is carried out by the simultaneous polymerization or the sequential polymerization, in a glass or metal mold at a reaction temperatures of 60° C. to 150° C. and under reaction pressures of atmospheric pressure to 10,000 atm., by polymerizing and crosslinking the hydrophilic or hydrophobic urethane resin of general formula (I) and styrene resin of general formula (II).

The process according to the present invention is to prepare an interpenetrating multi-component polymer membrane by mixing two or more materials selected from general formulae (I) and (II). The process is illustrated in detail in the following examples.

In order to examine separation characteristics, a liquid mixture was separated by a pervaporation process (J. Appln. Polym. Sci. 30, 179 (1985)) and tested for pervaporation rate P and separation factor $\alpha$;

$$P = \frac{w \cdot l}{a \cdot t}$$

wherein w, l, a and t denote the permeate weight, the membrane thickness, contact area and time, respectively, $$\alpha_i = \frac{P_i/P_j}{F_i/F_j}$$

wherein $P_i$ and $P_j$ denote the fractions of i and j components in the permeate respectively and $F_i$ and $F_j$ denote the fractions of i and j components in the liquid mixture respectively.

EXAMPLE 1

1 mol of hexamethylene diisocyanate (HDI) was placed into a four-neck flask under nitrogen gas environment at a temperature of 50°-55° C. ½ mol of polyethylene glycol (m.w. 1000) and 0.001 wt% of dibutyl tin dilaurate (T-12) a catalyst, were charged into a separating funnel connected to the flask, and the polyethylene glycol was gradually added to the flask and the mixture was constantly stirred at a rate of 300–500 rpm to prepare polyurethane polymer. ¼ mol of thus obtained polyurethane prepolymer 1/6 mole of trimethylolpropane, 35.7 g of styrene monomer mixture composed of 94.3 wt% of monomer, 4.7% of divinylbenzene and 1% of benzoyl peroxide, and 0.071 g of dibutyl tin dilaurate were mixed under agitation at about 500 rpm. The mixture then was casted in a fixed glass plate mold (100×100 mm) of 75 μm opening placed in a circulation oven, and is allowed to react at 80° C. for 24 hours and further at 120° C. for 4 hours. A prevaporation test of thus demolded polymer membrane was performed in a mixture of waterethanol (alcohol concentration of 95.6 wt%) at 25° C. and the amount of water permeated was condensed using liquid nitrogen, and collected. The composition of the permeated liquid was analyzed by gas chromatography and the permselectivity of water was calculated, the results are permeation rate: $1.5 \times 10^{-3} \frac{g \cdot cm}{cm^2 \cdot hr}$ permselectivity: 2 showing that water was permeated selectively and the tensile strength of the membrane swollen by water was 75.1 kg/cm².

EXAMPLE 2

Example 2 was carried out as example 1, but instead of polythylene glycol, a mixture of polyethylene glycol (E) and polytetramethylene ether glycol (T) of molecular weight 1000 was used in weight ratios of 8:2 (E8 T2), 6:4 (E6, T4), 2:8 (E2 T8) respectively.

The prevaporation test results for the mixture of water-ethanol (alcohol concentration 95.6 wt%) at 25° C. are shown in Table 1.

TABLE 1

| membrane | permeation rate $\left(\frac{g \cdot cm}{cm^2 \cdot hr}\right)$ | permselectivity | tensile strength (kg/cm²) |
|---|---|---|---|
| E8T2 | $1.05 \times 10^{-3}$ | 3 | 172 |
| E6T4 | $8 \times 10^{-4}$ | 3.5 | 390 |

TABLE 1-continued

| membrane | permeation rate ($\frac{g \cdot cm}{cm^2 \cdot hr}$) | perm-selectivity | tensile strength (kg/cm²) |
|---|---|---|---|
| E2T8 | $4 \times 10^{-4}$ | 4 | 475 |

EXAMPLE 3

Example 3 was executed as example 1 but instead of ½ mol of polyethylene glycol with molecular weight 1000, ½ mol of polyethylene glycol with molecular weight 300 was used to prepare a polymer membrane composed of polyurethane (U) and polystyrene (S) in ratios of 10:0 (U10 S0), 9:1 (U9 S1) and 8:2 (U8 S2) respectively.

Prevaporation test results of these membranes for water-ethanol (alcohol concentration 95.6 wt%) are shown in Table 2.

TABLE 2

| membrane | permeation rate ($\frac{g \cdot cm}{cm^2 \cdot hr}$) | permselectivity |
|---|---|---|
| U10S0 | $8 \times 10^{-3}$ | 2 |
| U9S1 | $7 \times 10^{-3}$ | 2.5 |
| U8S2 | $6 \times 10^{-3}$ | 4.5 |

EXAMPLE 4

Example 4 was carried out as example 1, but instead of styrene a mixture of styrene (S) and α-methylstyrene (M) was used in ratios of 9:1 (S9M1), 7:3 (S7M3), 5:5 (S5M5) respectively.

The prevaporation test results of the membrane for a mixture of water-ethanol (alcohol concentration: 95.6 wt%) at 25° C. are shown in Table 3.

TABLE 3

| membrane | permeation rate ($\frac{g \cdot cm}{cm^2 \cdot hr}$) | permselectivity |
|---|---|---|
| S9M1 | $1.4 \times 10^{-3}$ | 2.1 |
| S7M3 | $1.2 \times 10^{-3}$ | 2.2 |
| S5M5 | $1.0 \times 10^{-3}$ | 2.5 |

EXAMPLE 5

Example 5 was carried out as example 1 except that the synthesis pressure was raised at 1000, 2,500, 5000 kg/cm² thus resulting in improved permselectivity as shown in Table 4. A metal mold was used in this case instead of the glass mold.

TABLE 4

| | Permselectivity of water in membrane prepared at various pressures | | | | |
|---|---|---|---|---|---|
| | ethanol content in water (Wt. %) | | | | |
| synthesis pressure | 20 | 50 | 75 | 90 | 95 |
| 1,000 kg/cm² | 0.4 | 1.3 | 2.0 | 2.8 | 3.4 |
| 2,500 kg/cm² | 1.2 | 1.4 | 2.1 | 2.9 | 3.8 |
| 5,000 kg/cm² | 2.5 | 2.4 | 2.4 | 3.0 | 4.6 |

What is claimed is:

1. A process for the preparation of an interpenetrating polymer network membrane which comprises, subjecting a monomeric reaction mixture to a simultaneous polymerization and crosslinking reaction
or
a sequential polymerization and crosslinking reaction, in which the sequential polymerization comprises the steps of first forming one polymer network followed by forming another polymer network in the presence of the first formed polymer network, to produce at least a polymer network of a urethane resin and a polymer network of a styrene resin, wherein said urethane resin comprises units of formula (I)

$$-O-\underset{R_1}{\overset{O}{\underset{\|}{C}}}-NH-R_2-NH-\overset{O}{\underset{\|}{C}}- \quad (I)$$

wherein $R_1$ is $$-(-CH-CH_2)_{\overline{n}}O)_{\overline{m}},$$
  $\,\,\,\,|$
  $\,\,R_3$ $R_3$ stands for hydrogen or methyl group, n is integer of 1–3 and m is integer of 5–40, $R_2$ is either $-(CH_2)_{\overline{n}}-$, a diphenylmethane group, or a methylphenyl group with $CH_3$ wherein n is integer of 2–8, and wherein said styrene resin comprises units of formula (II)

$$+CH_2-\underset{R_4}{\overset{|}{\underset{|}{C}}}+ \quad (II)$$
(with phenyl substituent)

wherein $R_4$ is hydrogen or methyl group.

2. The process of claim 1, wherein each of said polymerization and crosslinking reactions is conducted and maintained at reaction temperatures within the range of 60° to 150° C.

3. The process of claim 1, wherein each of said polymerization and crosslinking reactions is conducted and maintained at reaction pressures within the range of 1 to 10,000 atm.

4. The process of claim 1, wherein said monomeric reaction mixture is subjected to the simultaneous polymerization and crosslinking reaction.

5. The process of claim 1, wherein said monomeric reaction mixture is subjected to the sequential polymerization and crosslinking reaction.

6. The process of claim 1, wherein said monomeric reaction mixture comprises monomers, prepolymers or mixtures thereof, crosslinking agents and catalysts or initiators.

7. The process of claim 1, wherein the urethane resin is derived from a condensation and crosslinking reaction of hexamethylene diisocyanate, polyethylene glycol and trimethylolpropane.

8. The process of claim 1, wherein the styrene resin is derived from an addition and crosslinking reaction of styrene and divinyl benzene or a styrene and α-methyl styrene mixture and divinyl benzene.

* * * * *